US011348131B2

(12) United States Patent
Kaufmann et al.

(10) Patent No.: US 11,348,131 B2
(45) Date of Patent: May 31, 2022

(54) DATA PROCESSING SYSTEMS FOR PROCESSING LAND TRACT DATA

(71) Applicant: Helios Center of Engineering Excellence, LLC, Sarasota, FL (US)

(72) Inventors: Nicholas Kaufmann, San Antonio, TX (US); Charles Rice, Austin, TX (US); Ed Turpin, San Antonio, TX (US)

(73) Assignee: Vento Energy, LLC, Austin, TX (US)

( * ) Notice: Subject to any disclaimer, the term of this patent is extended or adjusted under 35 U.S.C. 154(b) by 0 days.

(21) Appl. No.: 17/145,277

(22) Filed: Jan. 8, 2021

(65) Prior Publication Data

US 2021/0209630 A1    Jul. 8, 2021

Related U.S. Application Data

(60) Provisional application No. 62/958,701, filed on Jan. 8, 2020.

(51) Int. Cl.
| | |
|---|---|
| *G06Q 30/02* | (2012.01) |
| *G06Q 50/16* | (2012.01) |
| *G06F 40/205* | (2020.01) |
| *G06F 16/9032* | (2019.01) |
| *G06Q 40/06* | (2012.01) |
| *G06Q 50/20* | (2012.01) |

(52) U.S. Cl.
CPC ... *G06Q 30/0206* (2013.01); *G06F 16/90332* (2019.01); *G06F 40/205* (2020.01); *G06Q 30/0278* (2013.01); *G06Q 40/06* (2013.01); *G06Q 50/16* (2013.01); *G06Q 50/20* (2013.01)

(58) Field of Classification Search
None
See application file for complete search history.

(56) References Cited

U.S. PATENT DOCUMENTS

| | | | | |
|---|---|---|---|---|
| 6,658,460 | B1* | 12/2003 | Streetman | G06Q 10/063 709/217 |
| 7,676,420 | B1* | 3/2010 | Agnew | G06Q 40/04 705/37 |
| 8,209,265 | B1* | 6/2012 | Agnew | G06Q 30/04 705/311 |
| 2006/0217947 | A1* | 9/2006 | Castanon Fernandez | G06T 17/20 703/10 |

(Continued)

*Primary Examiner* — Jamie H Austin
(74) *Attorney, Agent, or Firm* — McDonnell Boehnen Hulbert & Berghoff LLP

(57) ABSTRACT

A method and system of allocating an interest in mineral rights. The method comprises receiving, in a memory of the server computing device, a set of land tract boundary data and a set of spacing unit boundary data from a plurality of data sources; defining, in a processor of the server computing device, based on standardizing the sets of land tract boundary data and spacing unit boundary data, a land tract polygon and a spacing unit polygon, the land tract and spacing unit polygons representing geo-located areas bounding a land tract and a spacing unit respectively; determining, in the processor, an intersection area defined in common between the land tract polygon and the spacing unit polygon; and allocating the interest in mineral rights based at least partly on the intersection area, an expected royalty rate, and an allocation factor attributable to at least one of a plurality of contributing sources associated with the mineral right.

18 Claims, 7 Drawing Sheets

(56) References Cited

U.S. PATENT DOCUMENTS

| | | | | |
|---|---|---|---|---|
| 2007/0087756 | A1* | 4/2007 | Hoffberg | G06Q 20/40 |
| | | | | 455/450 |
| 2007/0226004 | A1* | 9/2007 | Harrison | G06Q 30/02 |
| | | | | 705/26.1 |
| 2008/0249790 | A1* | 10/2008 | Sinclair | G06Q 10/10 |
| | | | | 705/1.1 |
| 2011/0087711 | A1* | 4/2011 | Justice | G06Q 50/18 |
| | | | | 707/804 |
| 2015/0109316 | A1* | 4/2015 | Burgin | G09B 29/007 |
| | | | | 345/581 |
| 2015/0228025 | A1* | 8/2015 | Allison | G06Q 50/06 |
| | | | | 705/36 R |
| 2015/0286630 | A1* | 10/2015 | Bateman | G06V 30/413 |
| | | | | 704/9 |
| 2015/0361767 | A1* | 12/2015 | Colvin | E21B 43/30 |
| | | | | 703/1 |
| 2016/0140677 | A1* | 5/2016 | Hejny | G06Q 50/163 |
| | | | | 705/40 |
| 2019/0226314 | A1* | 7/2019 | Dasys | G06Q 10/06375 |
| 2020/0029128 | A1* | 1/2020 | Erskine | H04N 21/25866 |
| 2020/0090288 | A1* | 3/2020 | Hejny | G06Q 30/0645 |
| 2021/0209630 | A1* | 7/2021 | Kaufmann | G06F 40/205 |

\* cited by examiner

DATA PROCESSING SYSTEMS FOR PROCESSING LAND TRACT DATA

CROSS-REFERENCE TO RELATED APPLICATIONS

This application claims the benefit of priority to U.S. Provisional Patent Application No. 62,958,701 filed 8 Jan. 2020; said U.S. Provisional Patent Application No. 62,958,701 is incorporated in the entirety herein.

BACKGROUND

Field of the Art

This disclosure relates to systems and methods of allocating interests in mineral rights holdings.

Discussion of the State of the Art

When a drilling company operates wells on a leased area (i.e., spacing unit) that affects a mineral rights holding, the drilling company owes the owner of that mineral rights holding a royalty check. Sometimes there are numerous mineral rights owners in one leased area and there may be one or more wells in a leased area. Calculating the royalty for each mineral rights owner can be time consuming and tedious when there are numerous overlapping mineral rights holdings and wells.

Currently, drilling companies manually collect mineral rights owner's information and well information, and then manually identify the spacing units that intersect the impacted mineral holding. The division of interest is manually converted to a dollar amount by multiplying the division of interests by the current market value of well extracts and the volume extracted over a given period of time.

A problem with the current method of calculating mineral rights royalty payments is that it is time consuming to manually associate each well to a spacing unit, and then manually tie each spacing unit to every mineral tract the unit crossed to generate the royalty checks for each mineral rights holder.

Another problem with the current method is that there is too much well data and it is difficult to get current well information for the millions of wells that may or may not impact a specific leased area. Moreover, the well data may be stale (i.e., the status of old wells may need to be updated to reflect any changes that may have occurred).

Another problem with the current method is that drilling companies often find that there is duplicate data throughout and across the drilling company.

SUMMARY

The present invention utilizes a system and method for calculating mineral rights royalties. The system and method described herein, in accordance with an embodiment of the invention, automatically calculates mineral rights royalty payments. Specifically, the system collects spacing unit information and standardizes it. Once the spacing unit information is standardized, it is used to look up corresponding shapes for land tracts and spacing units in a geospatial database. The corresponding shapes are overlaid with each other and the division of interest is calculated from where the land tract intersects the spacing unit. The percentage overlap (i.e., area of intersection) of the two shapes is used to calculate the mineral rights royalty payment. This first calculation is evaluated by users and corrected as necessary by attaching corrected values to the land tract and spacing unit to get true accurate values.

One benefit of the present invention is that it is faster than the current method. The present invention automatically creates the spacing units for wells and calculates a rough first pass division of interest. A royalty rate associated with a land tract asset for existing or prospective production is typically negotiated beforehand. Upon calculating the division of interest, this can be combined with production values and financial assumptions to estimate an ultimate return on investment for a given land tract asset. The division of interest, which encompasses royalty payments in one embodiment, is thereby reduced to an instantaneous, real-time determination using the system and methods herein.

Another benefit of the present invention is that it utilizes the most current well data. The present invention automatically updates the old well values with daily and weekly population scripts.

A further benefit of the present invention is that it limits duplicate data for the well drilling company. The present invention uses a unified database in which any changes to one part of the application are seen immediately to all other parts and users.

A further benefit of the present invention is that it can be used for rapid onboarding and a land rating system where any grid selection will produce a rapid and rough estimation or prediction of key metrics related to business returns in the mineral space. This can be thought of as how mutual funds are often rated on a Buy/Hold/Sale scale or an A through E scale based on the likelihood of positive returns.

The system and methods provided herein can also be used for estimating ultimate returns in a given area based on data based on inputs such as nearby operator activity, nearby land sale prices, nearby actual and/or estimated production profile data, nearby geological features, etc. This enables more accurate realtime analysis of prospective buy areas and basins, financial modeling, production modeling for land tract assets, and better decision making in regard to prospective assets. For example, methods and systems of the division of interest as provided herein can be employed in financial modeling in conjunction with land tract production profile data, for example, to derive and instantaneously display royalty payments, or expected royalty payments, for comparing land tract assets included within a wider portfolio of such production and prospective assets. The system and methods provided herein can be applied for optimization and analysis, collection of asset-related financial data, land tract asset purchase and production decisions, and estimated ultimate return from a portfolio incorporating such assets.

In particular, provided is a method, performed in a server computing device, of allocating an interest in mineral rights. The method comprises receiving, in a memory of the server computing device, a set of land tract boundary data and a set of spacing unit boundary data from a plurality of data sources; defining, in a processor of the server computing device, based on standardizing the sets of land tract boundary data and spacing unit boundary data, a land tract polygon and a spacing unit polygon, the land tract and spacing unit polygons representing geo-located areas bounding a land tract and a spacing unit respectively, the geo-located areas defined in accordance one or more of a latitude boundary, a longitude boundary, and a distance measurement; determining, in the processor, an intersection area defined in common between the land tract polygon and the spacing unit polygon; and allocating the interest in mineral rights based at least partly on the intersection area, an expected royalty rate, and an allocation factor attributable to at least one of a plurality of contributing sources associated with the mineral right.

In one embodiment, allocating the interest comprises determining a royalty payment based at least partly on the intersection area, the expected royalty rate, and the allocation factor attributable to the at least one of the plurality of contributing sources associated with the mineral right.

In another aspect, the method further comprises allocating the interest in mineral rights based on a mineral acreage representing an area within the land tract that is associated with mineral contribution.

In another embodiment, the plurality of data sources includes at least two of: a website, a government land records data database, a crowd-sourced land records database, and based on parsing a document that includes text suggestive of a legal description of mineral rights.

In one variation the spacing unit boundary data is extracted from the plurality of data sources based at least in part on spacing unit text of the at least some of the plurality of data sources, the spacing unit text including at least a legal description defining a geo-located spatial area.

In another aspect, standardizing the spacing unit boundary data comprises generating a geospatial polygon based at least in part on the geo-located spatial area.

In another variation, the spacing unit polygon comprises a modified spacing unit polygon based on applying a quarter call, the quarter call defining a geospatial portion of the geo-located area bounding the spacing unit.

In another aspect, the spacing unit polygon comprises at least one of a join, an add and a combine operation applied in conjunction with at least one of the spacing unit polygon and the modified spacing unit polygon.

In one embodiment, the land tract polygon comprises a modified land tract polygon based on applying a quarter call, the quarter call defining a geospatial portion of the geo-located area bounding the land tract.

In another embodiment, the land tract polygon comprises a least one of a join, an add and a combine operation applied in conjunction with at least one of the land tract polygon and the modified land tract polygon.

Also provided is a server computing system comprising a processor and a memory including instructions, the instructions when executed in the processor causing operations comprising receiving, in the memory, a set of land tract boundary data and a set of spacing unit boundary data from a plurality of land tract data sources; defining, in the processor, based on standardizing the sets of land tract boundary data and spacing unit boundary data, a land tract polygon and a spacing unit polygon, the land tract and spacing unit polygons representing geo-located areas bounded by a land tract and a spacing unit respectively; determining, in the processor, an intersection area defined in common between the land tract polygon and the spacing unit polygon; and allocating an interest in mineral rights based at least partly on the intersection area, an expected royalty rate, and an allocation factor attributable to at least one of a plurality of contributing sources associated with the mineral right.

Further provided is a non-transitory machine readable medium storing processor-executable instructions, the instructions when executed in a processor causing operations comprising receiving, in the memory, a set of land tract boundary data and a set of spacing unit boundary data from a plurality of land tract data sources; defining, in the processor, based on standardizing the sets of land tract boundary data and spacing unit boundary data, a land tract polygon and a spacing unit polygon, the land tract and spacing unit polygons representing geo-located areas bounded by a land tract and a spacing unit respectively; determining, in the processor, an intersection area defined in common between the land tract polygon and the spacing unit polygon; and allocating an interest in mineral rights based at least partly on the intersection area, an expected royalty rate, and an allocation factor attributable to at least one of a plurality of contributing sources associated with the mineral right.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
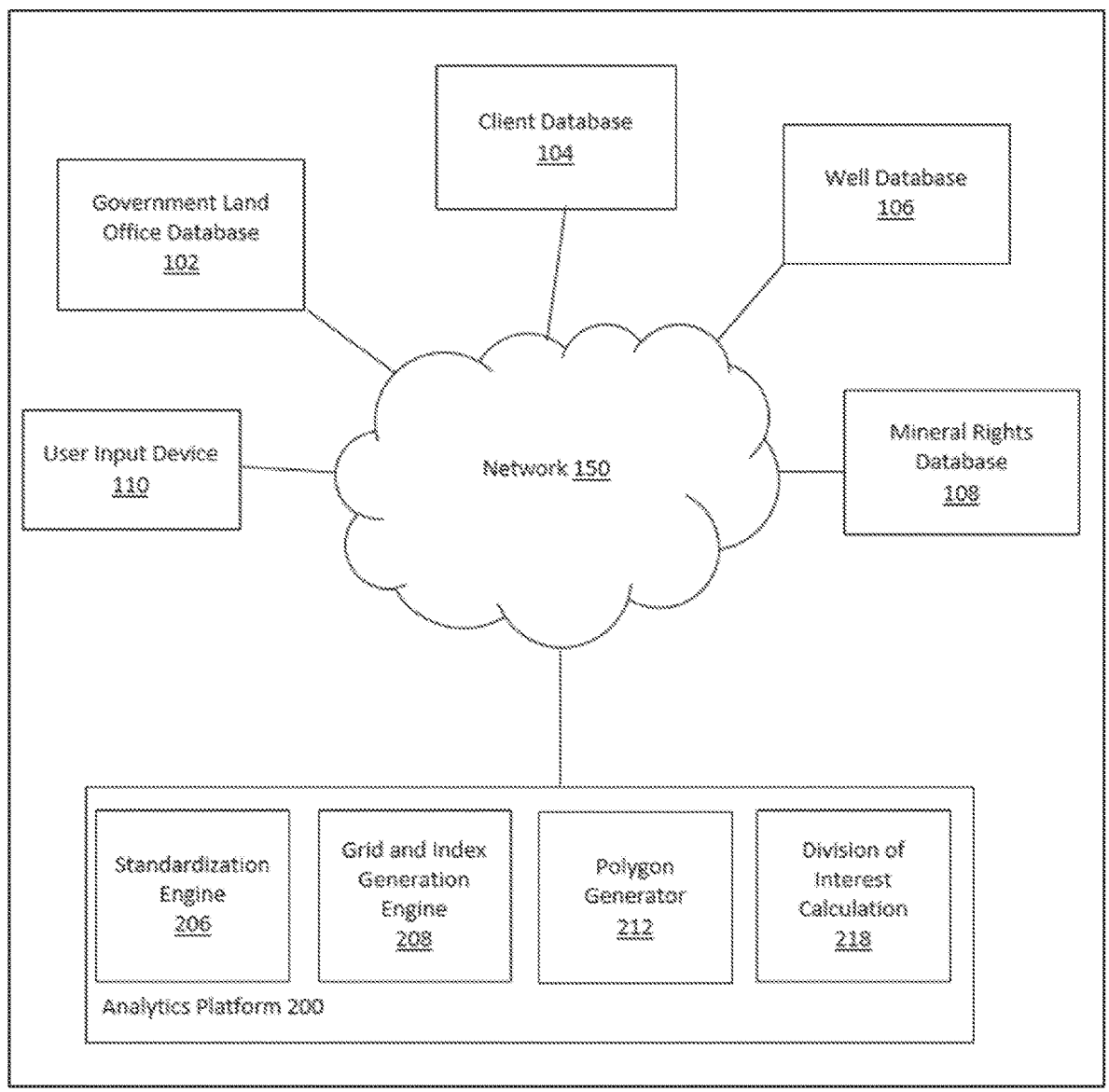
FIG. 1 illustrates a system for calculating mineral rights royalties with an exemplary embodiment of the invention.

The inventive system and method (hereinafter sometimes referred to more simply as "system" or "method") described herein significantly reduces the time it takes to calculate mineral rights royalty payments. Calculation of mineral rights payments in accordance with the system and methods provided herein enable more accurate decision making in context of multiple land tract assets, including production as well as prospective production assets, within a wider portfolio of such assets, ready identification of revenues including royalty payments and interest payments due from such assets, in furtherance of collection thereof. It also ensures that data is current and not duplicated. Specifically, the system collects spacing unit information and standardizes it. Once the spacing unit information is standardized, it is used to look up corresponding shapes for land tracts and spacing units in a geospatial database. The corresponding shapes are overlaid with each other and the division of interest is calculated from where the land tract intersects the spacing unit. The percentage overlap (i.e., area of intersection) of the two shapes is used to calculate the mineral rights royalty payment. This first calculation is evaluated by users and corrected as necessary by attaching corrected values to the land tract and spacing unit to get true accurate values. It can also be used as a comparison against later actual division of interest values received on incoming payments. It can further be applied to assist in comparative decision making and deal analysis, as the systems and methods herein enable an instantaneous, more accurate picture of comparative financial returns associated with any given group of tracts in any given area.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

Conceptual Architecture

FIG. 1 illustrates a system for calculating mineral rights royalties interests with an exemplary embodiment of the invention. The system includes an analytics platform 200, government land office database 102, well database 106, mineral rights database 108, client database 104, user input device 110, and network 150 over which various systems communicate and interact. The analytics platform 200 is described in greater detail in FIG. 2 below, however, generally, analytics platform 200 calculates mineral rights royalties. As illustrated in FIG. 1, the analytics platform 200 may be comprised of standardization engine 206, grid and index generation engine 208, polygon generator 212 and division of interest calculation 218. In some embodiments, aspects of analytics platform 200 can further incorporate functional capability of a production data aggregator, a financial modeling simulator, and an estimated overall or cumulative return simulator. The various computing devices described herein are exemplary and for illustration purposes only. The system may be reorganized or consolidated, as understood by a person of ordinary skill in the art, to perform the same tasks on one or more other servers or computing devices without departing from the scope of the invention.

In an exemplary embodiment, the system obtains land description information, well information and mineral rights information from various databases which is automatically standardized and used to create shapes that are overlain to determine the division of interest which is used to calculate the mineral rights royalty payments.

The analytics platform 200 calculates a division of interest, which may be used to compute royalties due to various mineral rights holders on minerals that are extracted from one or more wells.

The standardization engine 206 may convert the data collected into a standard format (e.g., form, etc.). The standardization engine 206 may receive data in a variety of formats (e.g., forms, etc.) and output a geolocator object.

The geolocator object may comprise in a human readable format. The geolocator object may comprise in a key format. The geolocator object may comprise a format that the grid and index generation engine 208 accepts as input. The standardization engine 206 may receive rules for converting data from a particular source into a geolocator object from an operator associated with the particular source.

The standardization engine 206 may receive data in a variety of formats (e.g., forms, etc.) and output the received data in a human readable format. The standardization engine 206 may receive data in a variety of formats (e.g., forms, etc.) and output the data in a key format. The standardization engine 206 may receive data in a variety of formats (e.g., forms, etc.) and output the received data in a format that the grid and index generation engine 208 accepts as input. For example, each government, company, or person may have a unique method for recording data. The standardization engine 206 may recognize relevant data from the recorded data (such as indications of geography, parties, interests, etc.) and convert the relevant data into a format accepted by the grid and index generation engine 208 as input. The standardization engine 206 may receive rules for converting data from a particular source into the standard format from an operator associated with the particular source.

The standardization engine 206 may standardize data associated with a well, such as an underground hydrocarbon well. The standardization engine 206 may standardize data associated with a spacing unit associated with a well. The standardization engine 206 may standardize data associated with mineral rights. The standardization engine 206 may standardize data associated with a tract associated with mineral rights.

The grid and index generation engine 208 may be used to find a location within the system. The grid and index generation engine 208 may receive input associated with a particular object from the standardization engine 206 and create one or more index(es) within a grid associated with the particular object. The grid and index generation engine 208 may receive the geolocator object associated with a particular object from the standardization engine 206 and create one or more index(es) within a grid associated with the particular object. The particular object may comprise a well, such as an underground hydrocarbon well. The particular object may comprise a spacing unit associated with a well. The particular object may comprise mineral rights. The particular object may comprise a tract associated with mineral rights. The one or more index(es) may represent location information associated with the particular object. The grid and index generation engine 208 may provide the one or more index(es) and information about the associated particular object to the polygon generator 212. The grid and index generation engine 208 may provide a geolocator object associated with the particular object to the polygon generator 212.

The polygon generator 212 may generate shapes (i.e., polygons) that may be used to identify tracts of land and spacing units. The polygon generator 212 may receive the one or more index(es) associated with the particular object from the grid and index generation engine 208. The polygon generator 212 may receive the information about the associated particular object from the grid and index generation engine 208. The polygon generator 212 may receive the geolocator object associated with the particular object from the grid and index generation engine 208. The polygon generator 212 may generate a polygon associated with the particular object.

The polygon generator 212 may comprise a database. The database may be indexed (or pre-indexed) by geolocators. The database may comprise a table that relates geolocators to polygons. The polygon generator 212 may return a polygon associated with the one or more index(es) and/or geolocator objects received from the grid and index generation engine 208. An index and/or a geolocator may comprise an indication that an interest may be a partial interest, such as a "quarter call". For example, if a geolocator has a quarter call of or similar to "the W/2 of object A," then object A may be divided in half along a vertical axis, and the polygon generator 212 may return the western half of object A. As another example, if a geolocator has a quarter call of or similar to "the NW/4 of object B," then object B may be divided in half a first time along a vertical axis, divided in half a second time along a horizontal axis, and the polygon generator 212 may return the northwestern quarter of object B.

In an embodiment, the one or more index(es) received from the grid and index generation engine 208 may be ordered. In the embodiment, the polygon generator 212 may create boundaries of a polygon by creating a line connecting adjacent indexes. For example, the polygon generator 212 may create a first line between a first index and a second index, a second line between the second index and a third index, a second-to-last line between a second-to-last index and a last index, and a last line between the last index and the first index. The created lines may define a representation of a boundary of the particular object within a grid.

A polygon created by the polygon generator 212 may represent a well, such as an underground hydrocarbon well. A polygon created by the polygon generator 212 may represent a spacing unit associated with a well. A polygon created by the polygon generator 212 may represent mineral rights. A polygon created by the polygon generator 212 may represent a tract associated with mineral rights.

The division of interest calculation 218 may calculate the division of interest from the intersection of the land tract shapes and spacing unit shapes. Once the division of interest is calculated, it may be used to determine the expected royalty payments or interests. An area associated with polygon representing an underground hydrocarbon well and/or a spacing unit associated with a well, may represent a total amount of interest associated with a drilling lease. An area associated with mineral rights and/or a tract associated with mineral rights, may represent a percentage of an interest (e.g., a pooled interest, a shares interest, etc.) associated with a drilling lease. The division of interest calculation 218 may determine the percentage of a drilling lease owed to an owner of a particular tract associated with particular mineral rights by determining the percentage of the particular spacing unit associated with the drilling lease that the particular tract occupies. For example, a 10-acre square tract may reside entirely within a 100-acre spacing unit. The division of interest calculation 218 may determine that the 10-acre square tract occupies 10% of the spacing unit. The division of interest calculation 218 may determine that an owner of the 10-acre square tract is entitled to 10% of the proceeds available for tracts within the spacing unit.

The division of interest calculation 218 may determine a division of interest in accordance with the following equation:

$$\frac{\text{Net Mineral Acres}}{\text{Spacing Unit Area}} * \frac{\text{Overlap Area}}{\text{Land Tract Polygon Area}} * \text{Royalty} * \text{Allocation}$$

where:
Overlap Area=area of overlap between the land tract polygon and the spacing unit polygon
Royalty=applicable royalty rate associated with the mineral right
Allocation=allocation factor attributed to a respective contributing source associated with the mineral right The division of interest calculation 218 may determine all wells and/or spacing units associated a particular mineral right and/or tract. The division of interest calculation 218 may determine all mineral rights and/or tracts for a particular well and/or spacing unit.

The government land and office database 102 contains information about land and mineral rights attached to land. Specifically, the government land and office database 102 may contain the legal description of land. The legal description may be in a standardized format. The legal description may not be in a standardized format.

The well database 106 contains information about wells. Specifically, the well database 106 may contain information about the location of wells, the output of wells or other information regarding wells that may be useful or understood by a person skilled in the art. The well database 106 may comprise spacing unit information associated with wells. The well database 106 may comprise boundaries for underground hydrocarbon wells, production data, basin drilling basin data, and well operator information, such that operator performance and activity can be analyzed and compared. The well database 106 may be maintained by a government regulatory body. For example, the Oklahoma Corporation Commission may maintain the well database 106 for underground hydrocarbon wells and/or spacing units within the state of Oklahoma. A private entity may maintain the well database 106. For example, a drilling company may store information (such as plots, legal descriptions, etc.) about areas the drilling company has leased in the well database 106.

The mineral rights database 108 contains information about the mineral rights on each tract of land. The mineral rights database 108 may contain ownership information, location information, past royalty payment information or other mineral rights information as would be understood by a person skilled in the art. The mineral rights database 108 may be maintained by a private entity, such as a drilling company, a real estate attorney, etc. The mineral rights database 108 may be maintained by a public entity, such as a city, county, and/or state government. The mineral rights database 108 may comprise net mineral acres associated with a tract of land.

The client database 104 contains information from others that is relevant to calculating the mineral rights royalty payments, such as, but not limited to, purchase cost of minerals, financial projections, production expectations, accounting and accounts receivable information to compare to projected or estimated metrics relating thereto. The client database 104 may comprise information related to a license related to a particular well and/or spacing unit associated with a well. The client database 104 may comprise information related to royalty interests and/or working interests. The client database 104 may comprise information related to mineral rights and/or tracts associated with mineral rights.

The user input device 110 (herein referred to as user input device, user device, or client device) include, generally, a computer or computing device including functionality for communicating (e.g., remotely) over a network 150. Data may be collected from client devices 110, and data requests may be initiated from each client device 110. Client device(s) 110 may be a server, a desktop computer, a laptop computer, personal digital assistant (PDA), an in- or out-of-car navigation system, a smart phone or other cellular or mobile phone, or mobile gaming device, among other suitable computing devices. Client devices 110 may execute one or more client applications, such as a web browser (e.g., Microsoft Windows Internet Explorer, Mozilla Firefox, Apple Safari, Google Chrome, and Opera, etc.), or a dedicated application to submit user data, or to make prediction queries over a network 150.

In particular embodiments, each user device 110 may be an electronic device including hardware, software, or embedded logic components or a combination of two or more such components and capable of carrying out the appropriate functions implemented or supported by the user device 110. For example and without limitation, a user device 110 may be a desktop computer system, a notebook computer system, a netbook computer system, a handheld electronic device, or a mobile telephone. The present disclosure contemplates any user device 110. A user device 110 may enable a network user at the user device 110 to access network 150. A user device 110 may enable its user to communicate with other users at other user devices 110.

A user device 110 may have a web browser, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user device 110 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 110 one or more Hyper Text Markup Language (HTML) files responsive to the HTTP request. The user device 110 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 110 may also include an application that is loaded onto the user device 110. The application 110 obtains data from the network 110 and displays it to the user within an application interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

The network 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network, a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to clients devices or other devices in response to HTTP or other requests from clients devices or other devices. A mail server is generally capable of providing electronic mail services to various clients devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Analytics Platform/Mineral Software Suite

Figure 2:
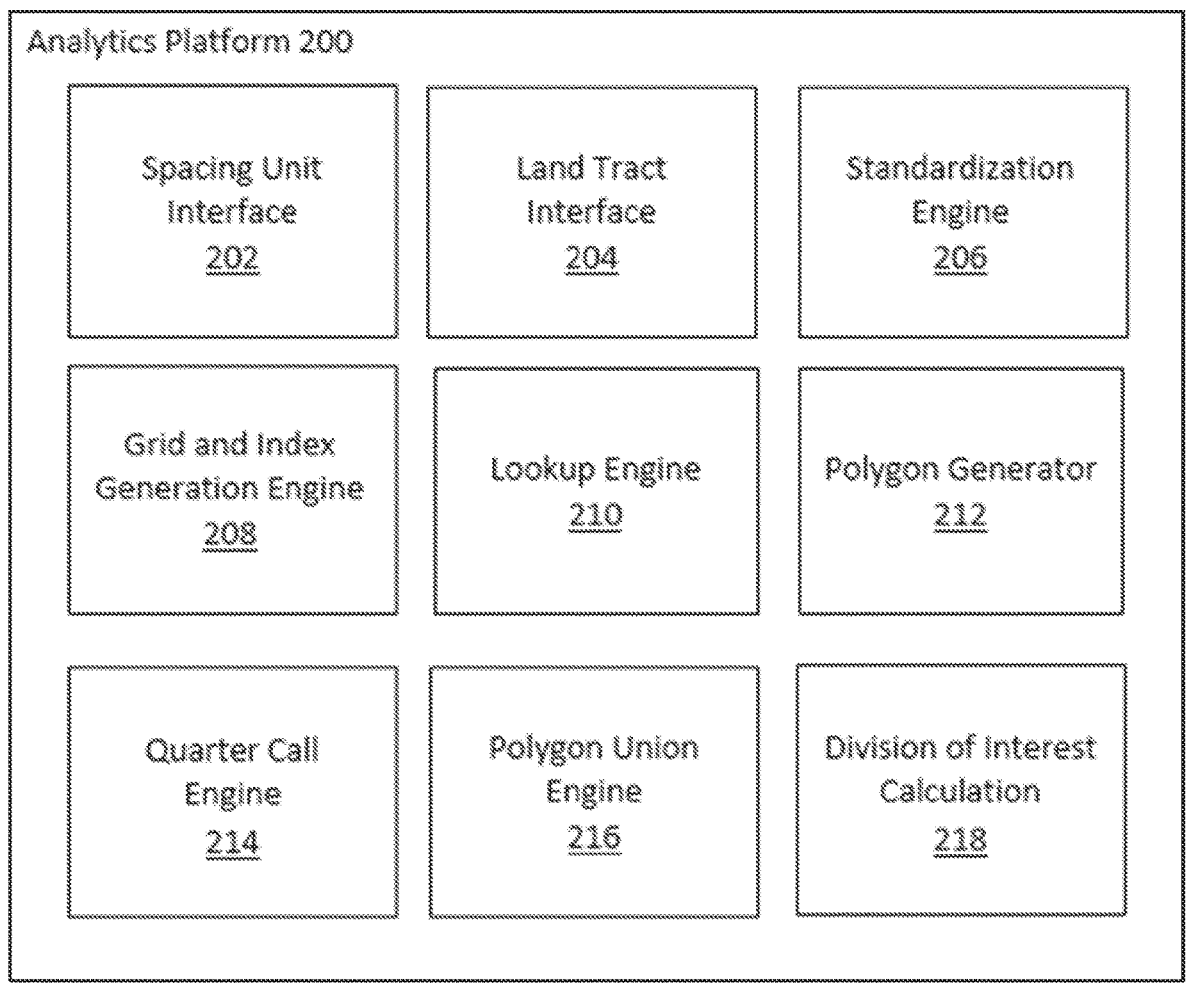
FIG. 2 illustrates the analytics platform of the mineral rights royalty calculation system in accordance with an embodiment of the invention.

FIG. 2 illustrates an exemplary embodiment of the analytics platform 200 of the mineral rights royalty payments calculation system in accordance with an embodiment of the invention. The analytics platform 200 generates the royalty payments for each specified mineral rights holder. The analytics platform 200 includes a spacing unit interface 202, land tract interface 204, standardization engine 206, grid and index generation engine 208, lookup engine 210, polygon generator 212, quarter call engine 214, polygon union engine 216 and division of interest calculation 218, and in some embodiments, financial models and land tract asset production data. Other systems and databases may be used, as would be readily understood by a person of ordinary skill in the art, without departing from the scope of the invention.

The spacing unit interface 202 may retrieve spacing unit information. The spacing unit interface 202 may communicate with the well database 106 in FIG. 1 via the network 150 in FIG. 1. The spacing unit interface 202 may communicate with the government land office database 102 in FIG. 1, the client database 104 in FIG. 1, the mineral rights database 108 in FIG. 1, and/or the user input device 110 in FIG. 1 via the network 150 in FIG. 1. The spacing unit interface 202 may be configured to receive one or more signals in a format suitable for the network in 150 in FIG. 1. For example, the spacing unit interface 202 may be configured to receive one or more Internet Protocol (IP)

signals. Although IP signals are specified, the spacing unit interface 202 may be configured to receive signals formatted in any communication protocol.

The spacing unit interface 202 may convert the one or more signals received via the network 150 in FIG. 1 into a format expected by one or more modules of the analytics platform 200. The spacing unit interface 202 may cause one or more modules of the analytics platform 200 to execute with particular parameters in response to the one or more received signals. The spacing unit interface 202 may deliver the converted one or more signals received from the well database 106 in FIG. 1 via the network 150 in FIG. 1 to the standardization engine 206.

The land tract interface 204 may retrieve mineral rights information. The land tract interface 204 may communicate with the mineral rights database 108 in FIG. 1 via the network 150 in FIG. 1. The land tract interface 204 may communicate with the government land office database 102 in FIG. 1, the client database 104 in FIG. 1, the well database 106 in FIG. 1, and/or the user input device 110 in FIG. 1 via the network 150 in FIG. 1. The land tract interface 204 may be configured to receive one or more signals in a format suitable for the network in 150 in FIG. 1. For example, the land tract interface 204 may be configured to receive one or more Internet Protocol (IP) signals. Although IP signals are specified, the land tract interface 204 may be configured to receive signals formatted in any communication protocol.

The land tract interface 204 may convert the one or more signals received via the network 150 in FIG. 1 into a format expected by one or more modules of the analytics platform 200. The land tract interface 204 may cause one or more modules of the analytics platform 200 to execute with particular parameters in response to the one or more received signals. The land tract interface 204 may deliver the converted one or more signals received from the mineral rights database 108 in FIG. 1 via the network 150 in FIG. 1 to the standardization engine 206.

The standardization engine 206 may receive one or more signals from the spacing unit interface 202 and/or the land tract interface 204 and convert the received signals into a format expected as input for the grid and index generation engine 208 and/or the lookup engine 210 ("standardized input"). The standardization engine 206 was described in more detail in reference to FIG. 1.

The grid and index generation engine 208 may receive standardized input from the standardization engine 206. The grid and index generation engine 208 may convert the standardized input into one or more geolocator objects. The grid and index generation engine 208 may convert the standardized input into one or more index(ex) within a grid. The grid and index generation engine 208 may convert the standardized input into a format expected as input for the lookup engine 210. The grid and index generation engine 208 may convert the standardized input into a format expected as input for the polygon generator 212. The grid and index generation engine 208 was described in more detail in reference to FIG. 1.

The lookup engine 210 may receive standardized input from the standardized engine 206. The lookup engine 210 may receive one or more geolocator objects from the grid and index generation engine 208. The lookup engine 210 may determine if a grid exists for the given input. If a grid does not exist for the given input, then a grid may be created for the given input. If a grid does exist for the given input, then the grid may be retrieved.

The polygon generator 212 may retrieve a polygon associated with one or more geolocator object(s). The polygon generator 212 may create (e.g., generate, make, etc.) a polygon associated with one or more index(es). The polygon generator 212 was described in more detail in reference to FIG. 1.

The quarter call engine 214 breaks down the location further. It is described herein as a quarter call engine 214, however, the location may be broken down into other sized areas as would be apparent to one skilled in the art. The quarter engine 214 may take in the polygon retrieved from the polygon generator 212, a division, and a particular selection, and return a polygon representing the particular selection of a divided version of the polygon. For example, if the quarter engine 214 receives a square polygon and an indication of half and north, then the quarter engine 214 may return a rectangle polygon (comprising the same length as the square polygon, but half the height) that is representative of the northern half of the square polygon. As another example, if the quarter engine 214 receives a square polygon and an indication of half and east, then the quarter engine 214 may return a rectangle polygon (comprising the same height as the square polygon, but half the length) that is representative of the eastern half of the square polygon. As another example, if the quarter engine 214 receives an original square polygon and an indication of quarter and northeast, then the quarter engine 214 may return a second square polygon (comprising half the height and half the length as the original square polygon) that is representative of the northeastern quarter of the original square polygon.

The polygon union engine 216 uses computational geometry to join the generated polygons (i.e., shapes). The polygon union engine 216 may join polygons from the polygon generator 212 and/or the quarter engine 214 to the grid created and/or retrieved from the lookup engine 210.

The division of interest calculation 218 may calculate the division of interest from the intersection of the land tract shapes and spacing unit shapes. Once the division of interest is calculated, it may be used to determine the expected royalty payments. The division of interest calculation 218 may use the output of the polygon union engine 216 to determine interests owed. The division of interest calculation 218 may determine that a first polygon corresponding to a well and/or a spacing unit associated with a well is associated with a licensing fee. The division of interest calculation 218 may determine that a second polygon corresponding to mineral rights and/or a tract associated with mineral rights overlaps with x % of the first polygon. The division of interest calculation 218 may determine that an owner associated with the mineral rights and/or the tract associated with the mineral rights associated with the second polygon is entitled to x % of the associated licensing fee.

Figure 3:
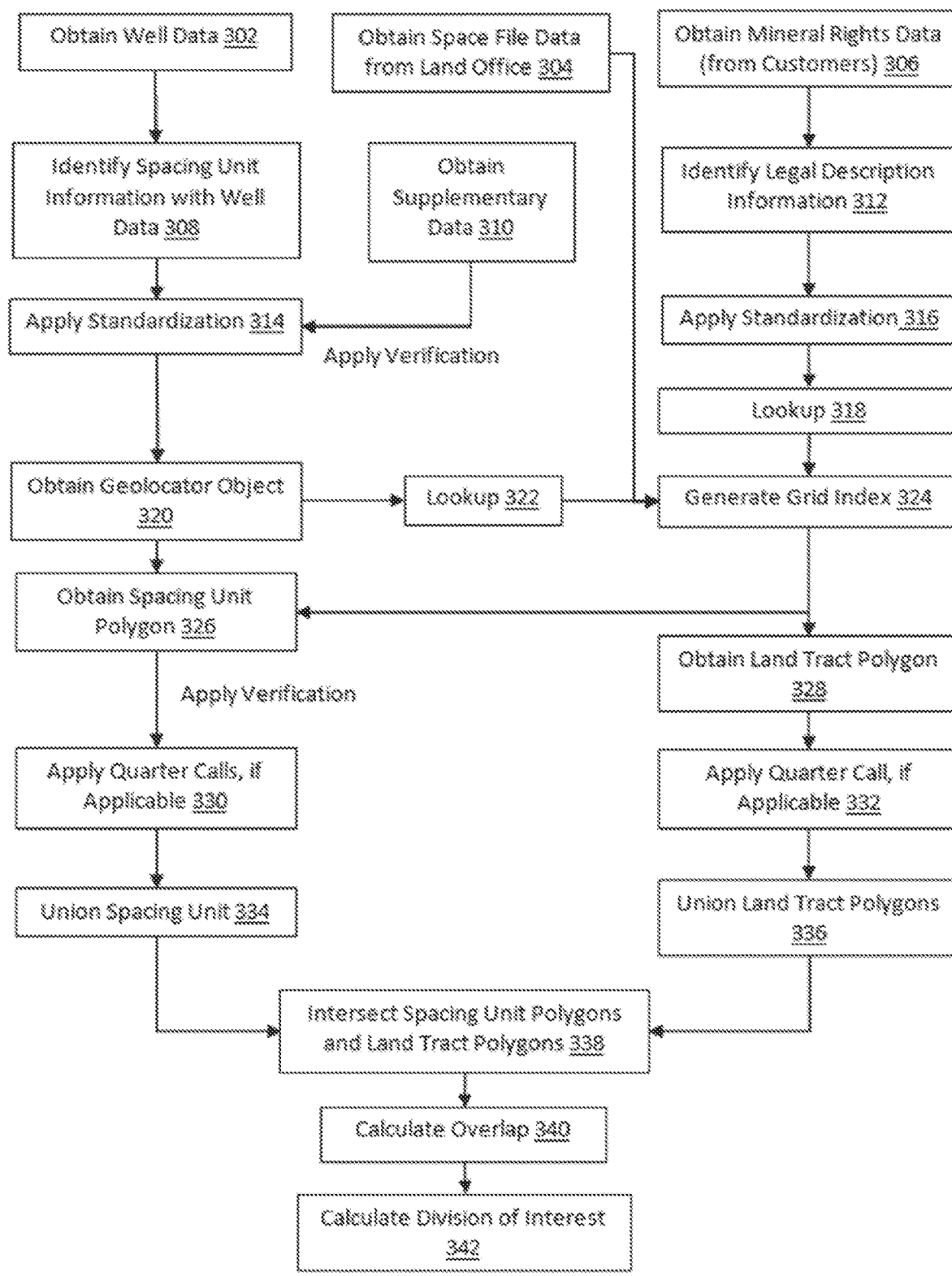
FIG. 3 illustrates a flowchart for calculating mineral rights royalties in accordance with an exemplary embodiment of the present invention.

The division of interest calculation 218 may use the following equation:

$$\frac{\text{Land Tract Polygon Net Mineral Acres}}{\text{Spacing Unit Area}} * \frac{\text{Overlap Area}}{\text{Land Tract Polygon Area}} * \text{Royalty} * \text{Allocation}$$

as described in more detail in reference to FIG. 1, where:
Overlap Area=area of overlap between the land tract polygon and the spacing unit polygon
Royalty=applicable royalty rate associated with the mineral right
Allocation=allocation factor attributed to a respective contributing source associated with the mineral right Processes for Calculating Mineral Rights Royalties FIG. 3 illustrates an exemplary process for calculating mineral rights royalties in accordance with an exemplary embodiment of the present invention.

At 302, well data may be obtained. For example, the spacing unit interface 202 in FIG. 2 may obtain well data from the well database 106 in FIG. 1 via the network 150 in FIG. 1. Well data may comprise a licensing fee associated with a well. Well data may comprise spacing information associated with the well.

At 304, space file data may be obtained from a land office. For example, the spacing unit interface 202 in FIG. 2 and/or the land tract interface 204 in FIG. 2 may obtain space file data from the government land office database 102 in FIG. 1 via the network 150 in FIG. 1. Space file data may comprise official real estate data recorded with a government.

At 306, mineral rights data may be obtained from customers. For example, the land tract interface 204 in FIG. 2 may obtain mineral rights data from the client database 104 in FIG. 1 and/or the mineral rights database 108 in FIG. 1 via the network 150 in FIG. 1. Mineral rights data may comprise data associated with owners of mineral rights of a particular tract. Mineral rights data may comprise location information of the particular tract. Mineral rights data may comprise legal description information of the particular tract. Mineral rights data may comprise net mineral acres associated with mineral contribution, or mineral production, with the particular tract.

At 308, spacing unit information may be identified from within the well data obtained at 302. For example, the standardization engine 206 in FIG. 2 may identify spacing unit information from within the well data obtained at 302. Spacing unit information may be identified by parsing documents to look for certain words (such as, for example, "spacing unit", "proration unit", "pool unit" etc.) or fields in a certain format (such as, for example, a format that would suggest a legal description of land, a geolocator format, a latitude and/or longitude, etc.).

At 310, supplementary data may be obtained. For example, the spacing unit interface 202 in FIG. 2 and/or the land tract interface 204 in FIG. 2 may obtain supplementary data from the government land office database 102 in FIG. 1, the client database 104 in FIG. 1, the well database 106 in FIG. 1 and/or the user input device 110 in FIG. 1 via the network 150 in FIG. 1. Supplementary data may comprise location description information from contracts, recording offices, etc.

At 312, legal description information may be identified from within the mineral rights data obtained at 306. For example, the standardization engine 206 in FIG. 2 may identify legal description information from within the mineral rights data obtained at 306. Legal description information may be identified by parsing documents to look for certain words (such as, for example, "mineral rights", "mineral interest", "mineral estate" etc.) or fields in a certain format (such as, for example, a format that would suggest a legal description of land, a geolocator format, a latitude and/or longitude, etc.).

At 314, a standardization may be applied to the spacing unit information identified in 308 and the supplementary data obtained in 310. For example, the standardization engine 206 in FIG. 2 may apply standardization to the spacing unit information identified in 308 and the supplementary data obtained in 310. Additionally, the supplementary data obtained in 310 may be used to verify the spacing unit information identified in 308. For example, a legal description in a contract and/or in a governmental recording and/or in a regulatory filing obtained in 310 may be used to verify the accuracy of the spacing unit information identified in 308.

At 316, a standardization may be applied to the legal description information identified in 312. For example, the standardization engine 206 in FIG. 2 may apply standardization to the legal description information identified in 312.

At 318, a lookup may be performed using the data standardized at 316. For example, the lookup engine 210 in FIG. 2 may perform a lookup using the data standardized at 316. If a grid already exists for the data standardized at 316, then the grid may be retrieved and the process may move to 328. If the grid does not exist, then the process may move to 324.

At 320, a geolocator object may be obtained for the data standardized at 314. For example, the standardized engine 206 in FIG. 2 and/or the grid and index generation engine 208 in FIG. 2 may obtain a geolocator object for the data standardized at 314.

At 322, a lookup may be performed using the geolocator object obtained at 320. For example, the lookup engine 210 in FIG. 2 may perform a lookup using the geolocator object obtained at 320. If a grid already exists for the geolocator object obtained at 320, then the grid may be retrieved and the process may move to 326. If the grid does not exist, then the process may move to 324.

At 324, a grid index may be generated. For example, the grid and index generation engine 208 in FIG. 2 may generate a grid index. Space file data obtained from the land office at 304 may be used to generate the grid index. Data from the lookup at 318 may be used to generate the grid index. Data from the lookup at 322 may be used to generate the grid index. Data from the lookup at 318 and/or 322 may inform which portions of the space file data obtained from the land office at 304 should be used to generate the grid index.

At 326, one of more spacing unit polygon(s) may be obtained. For example, the polygon generator 212 in FIG. 2 may obtain one or more spacing unit polygon(s). Obtaining a spacing unit polygon may comprise retrieving a polygon associated with a geolocator object. Obtaining a spacing unit polygon may comprise creating a polygon associated with a plurality of indexes. Verification may be performed on the one or more spacing unit polygon(s). For example, a spacing unit polygon may be verified to ensure the spacing unit polygon comprises an expected well. As another example, a spacing unit polygon may be verified to ensure the spacing unit polygon is a solid polygon. As another example, an acreage associated with a spacing unit polygon may be calculated and verified against an expected acreage. As another example, a spacing unit polygon may be verified against a legal description.

At 328, one or more land tract polygon(s) may be obtained. For example, the polygon generator 212 in FIG. 2 may obtain one or more land tract polygon(s). Obtaining a land tract polygon may comprise retrieving a polygon associated with a geolocator object. Obtaining a land tract polygon may comprise creating a polygon associated with a plurality of indexes.

At 330, quarter calls may be applied to the one or more spacing unit polygon(s) obtained at 326, if applicable. For example, the quarter call engine 214 in FIG. 2 may apply quarter calls to the one or more spacing unit polygon(s) obtained at 326, if applicable. For example, if a first spacing unit is square and a quarter call indicates that a north half of the first spacing unit should be used, then after the quarter call is applied, a rectangle twice as long as high that is representative of the northern half of the first spacing unit may be retained as a polygon representative of the first spacing unit after the quarter call is applied. As another example, if a second spacing unit is square and a quarter call indicates that an east half of the second spacing unit should be used, then after the quarter call is applied, a rectangle twice as high as long that is representative of the eastern half of the second spacing unit may be retained as a polygon representative of the second spacing unit after the quarter call is applied. As another example, if a third spacing unit is square and a quarter call indicates that a northeast quarter of the third spacing unit should be used, then after the quarter call is applied, a square that is representative of the northeastern quarter of the third spacing unit may be retained as a polygon representative of the third spacing unit after the quarter call is applied.

At 332, quarter calls may be applied to the one or more land tract polygon(s) obtained at 328, if applicable. For example, the quarter call engine 214 in FIG. 2 may apply quarter calls to the one or more land tract polygon(s) obtained at 328, if applicable. For example, if a first land tract is square and a quarter call indicates that a north half of the first land tract should be used, then after the quarter call is applied, a rectangle twice as long as high that is representative of the northern half of the first land tract may be retained as a polygon representative of the first land tract after the quarter call is applied. As another example, if a second land tract is square and a quarter call indicates that an east half of the second land tract should be used, then after the quarter call is applied, a rectangle twice as high as long that is representative of the eastern half of the second land tract may be retained as a polygon representative of the second land tract after the quarter call is applied. As another example, if a third land tract is square and a quarter call indicates that a northeast quarter of the third land tract should be used, then after the quarter call is applied, a square that is representative of the northeastern quarter of the third land tract may be retained as a polygon representative of the third land tract after the quarter call is applied.

At 334, the one or more spacing unit polygon(s) obtained at 326, as modified by the application of quarter calls at 330 if applicable, may be joined with the grid retrieved at 318 or 322 or generated at 324. The polygon union engine 216 in FIG. 2 may union (e.g., join, add, combine, etc.) the one or more spacing unit polygon(s) obtained at 326, as modified by the application of quarter calls at 330 if applicable, with the grid retrieved at 318 or 322 or generated at 324.

At 336, the one or more land tract polygon(s) obtained at 328, as modified by the application of quarter calls at 332 if applicable, may be joined with the grid retrieved at 318 or 322 or generated at 324. The polygon union engine 216 in FIG. 2 may union (e.g., join, add, combine, etc.) the one or more land tract polygon(s) obtained at 328, as modified by the application of quarter calls at 332 if applicable, with the grid retrieved at 318 or 322 or generated at 324. In a further embodiment, the polygon generator can also accept as input a polygon that has been drawn by the user in accordance with user-defined boundaries, in lieu of a pre-existing standardized land tract.

At 338, an intersection of one or more spacing unit polygon(s) with one or more land tract polygon(s) may be identified. For example, the division of interest calculation 218 in FIG. 2 may identify an intersection of one or more spacing unit polygon(s) with one of more land tract polygon(s). When an intersection of one or more spacing unit polygon(s) with one of more land tract polygon(s) is identified, a division of interest may need to be calculated.

At 340, in response to identifying an intersection in 338, an overlap between a spacing unit polygon and a land tract polygon may be calculated. For example, the division of interest calculation 218 in FIG. 2 may calculate an overlap between a spacing unit polygon and a land tract polygon in response to identifying an intersection between the spacing unit polygon and the land tract polygon in 338.

At 342, a division of interest may be calculated. For example, the division of interest calculation 218 in FIG. 2 may calculate a division of interest. The division of interest may be calculated using a formula such as:

$$\frac{\text{Land Tract Polygon Net Mineral Acres}}{\text{Spacing Unit Area}} * \frac{\text{Overlap Area}}{\text{Land Tract Polygon Area}} * \text{Royalty} * \text{Allocation}$$

The division of interest may be calculated using the percentage of overlap as a total to the spacing unit polygon.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 4:
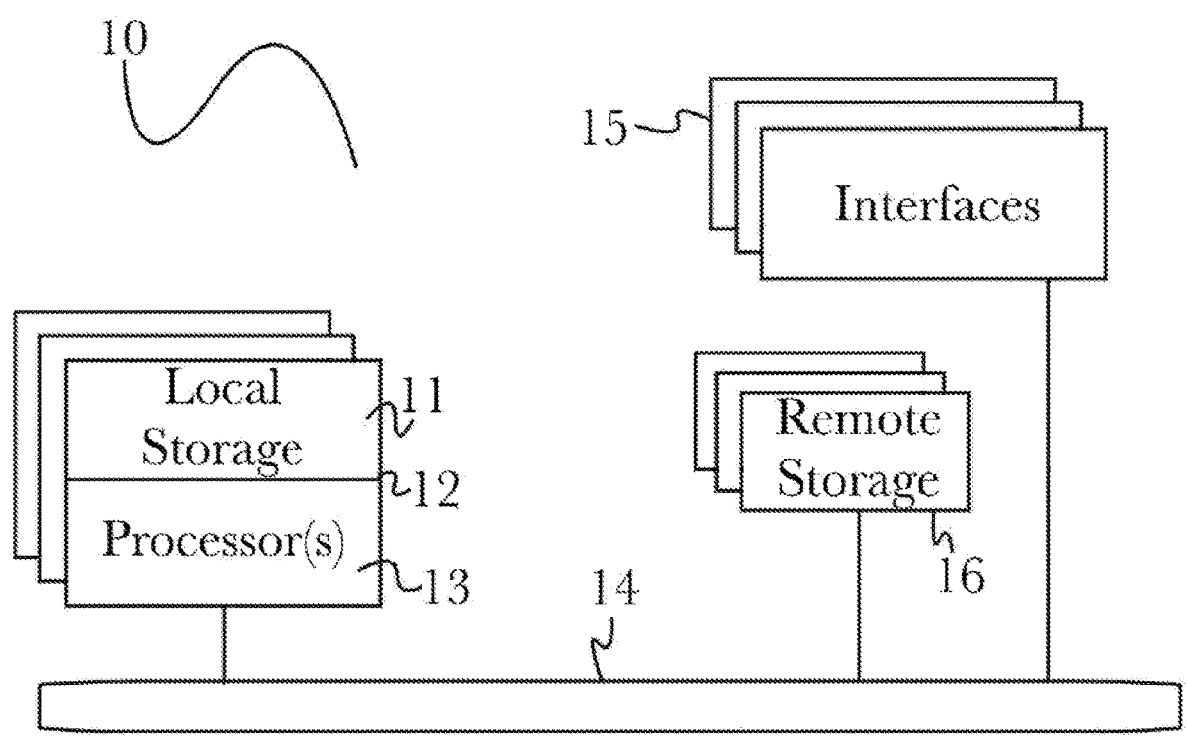
FIG. 4 illustrates an exemplary computing device that supports an embodiment of the inventive disclosure.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

The computing device 10 may be and/or comprise the analytics platform 200.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
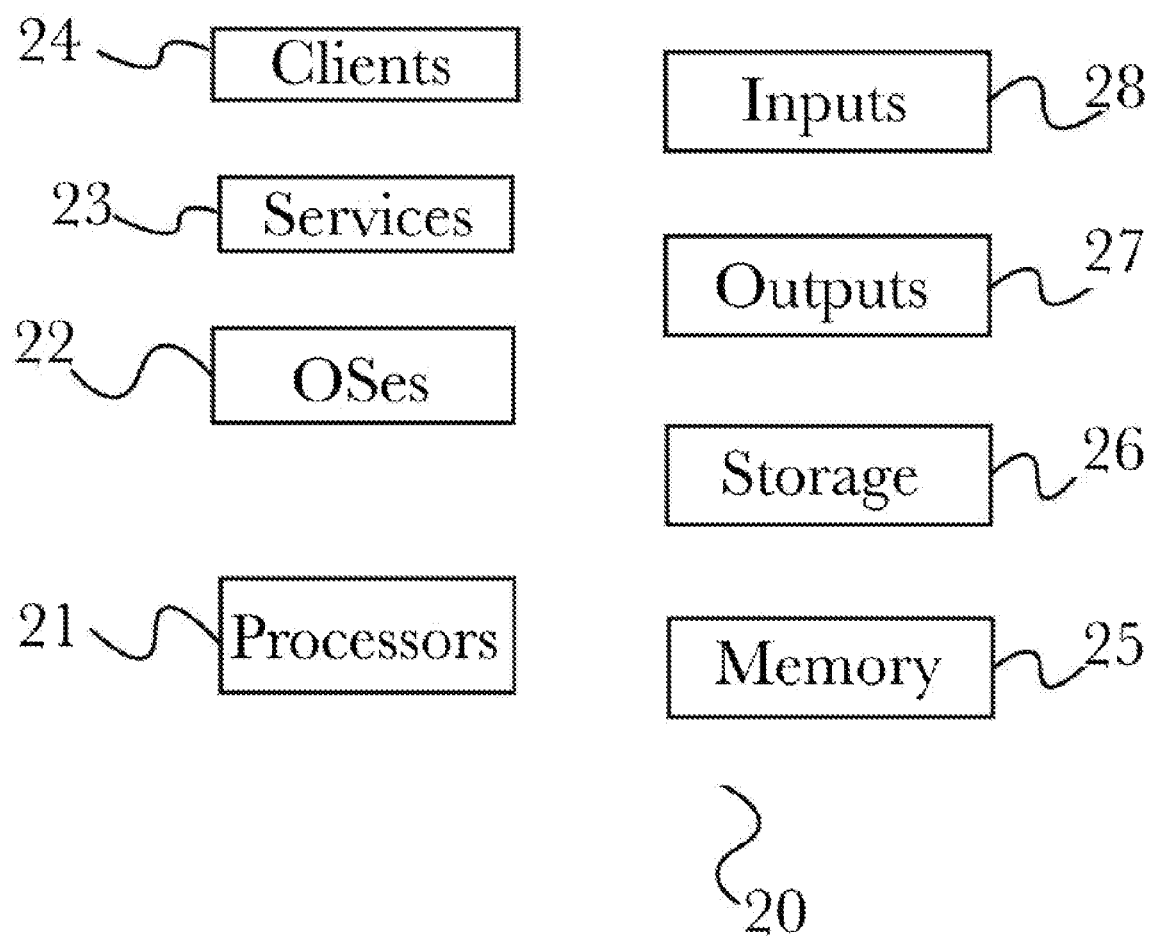
FIG. 5 illustrates an exemplary standalone computing system that supports an embodiment of the inventive disclosure.

In some embodiments, systems may be implemented on a standalone computing system. Referring now to FIG. 5 above, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 5). Examples of storage devices 26 include flash memory, magnetic hard drive, CD-ROM, and/or the like.

The system 20 may be and/or comprise the analytics platform 200.

Figure 6:
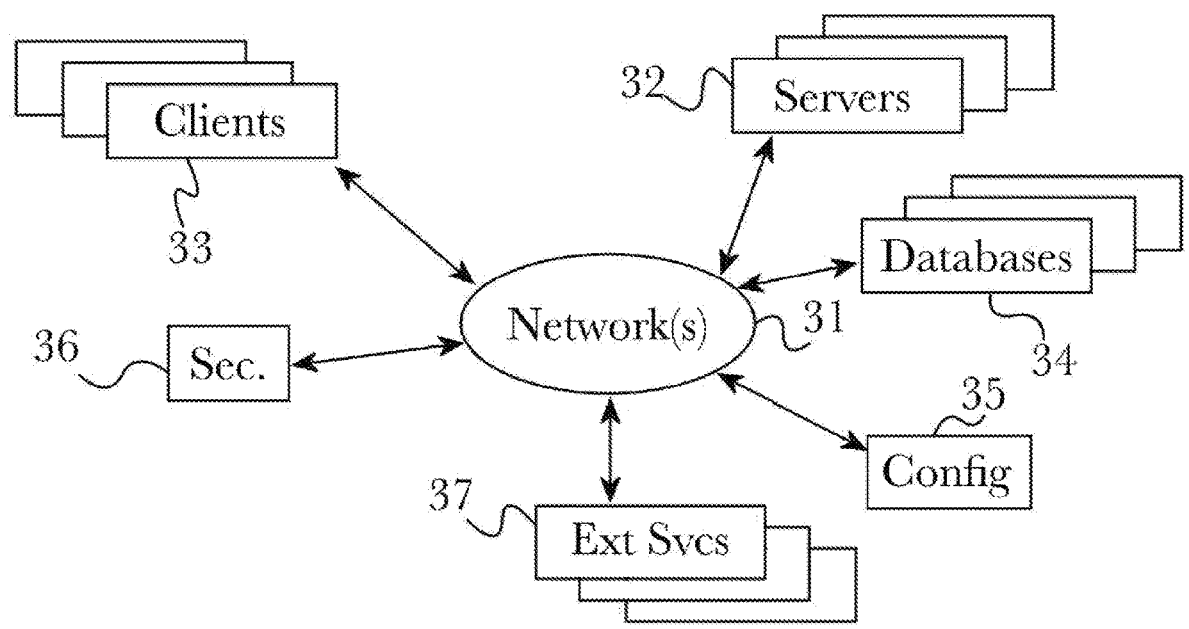
FIG. 6 illustrates on embodiment of the computing architecture that supports an embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

The one or more of the server(s) 32 may be and/or comprise the analytics platform 200.

Figure 7:
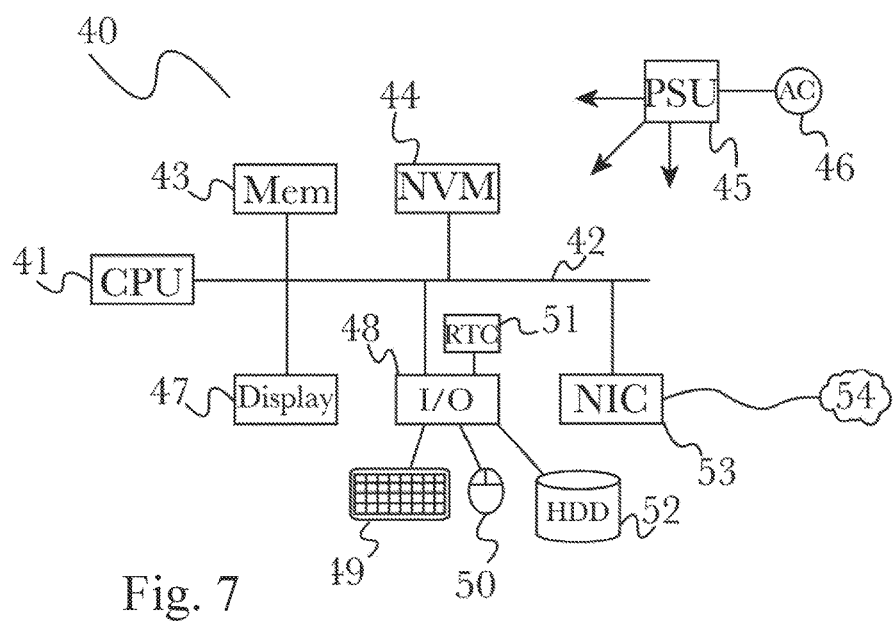
FIG. 7 illustrates an exemplary overview of a computer system that supports an embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

The computer system 40 may be and/or comprise the analytics platform 200.

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer-implemented data processing method for processing a request to generate a report attributing interests in minerals that may be extracted from a land tract, the computer-implemented data processing method comprising calculating allocation based on land tract boundary data and spacing unit boundary data associated with the land tract, the method comprising:

receiving, over a network, in a memory of a server computing device, land tract boundary data and spacing unit boundary data from a plurality of data sources comprising a plurality of databases, wherein the land tract boundary data and spacing unit boundary data comprise one or more documents in a variety of formats, wherein the one or more documents include text suggestive of a legal description of mineral rights;

automatically parsing, in a processor of the server computing device, the one or more documents by searching for a predetermined set of words to identify spacing unit information and the legal description of mineral rights in the land tract;

receiving, at the server computing device, respective rules for automatically converting the variety of formats into a standard format;

applying, by the server computing device using the respective rules, standardization to the spacing unit information and the legal description of mineral rights in the land tract to generate standardized spacing unit information and standardized legal description of mineral rights in the land tract;

outputting, by the server computing device using the standardized spacing unit information and the standardized legal description of mineral rights, a geolocator object, wherein the server computing device has access to a geospatial database indexed by geolocator objects;

automatically looking up, by the server computing device using the geolocator object, content of the geospatial database, thereby generating a land tract polygon and a spacing unit polygon, the land tract and spacing unit polygons representing geo-located areas bounding a land tract and a spacing unit respectively, the geo-located areas defined in accordance with one or more of a latitude boundary, a longitude boundary, and a distance measurement;

overlaying, by a processor of the server computing device, the land tract polygon and the spacing unit polygon;

automatically computing, in the processor based on the overlaying, an intersection area defined in common between the land tract polygon and the spacing unit polygon;

identifying, in real time, interests in mineral rights in the bounded land tract based at least partly on the intersection area, an expectation factor, and an allocation factor attributable to at least one of a plurality of contributing sources associated with the minerals that may be extracted from the bounded land tract; and generating a display of the interests in mineral rights on a display coupled to the server computing device.

2. The method of claim 1 wherein allocating the interest comprises determining a royalty payment based at least partly on the intersection area, the expected royalty rate, and the allocation factor attributable to the at least one of the plurality of contributing sources associated with the mineral rights.

3. The method of claim 1 further comprising allocating the interests in mineral rights based on a mineral acreage representing an area within the land tract that is associated with mineral contribution.

4. The method of claim 1 wherein the plurality of databases includes at least two of: a website, a government land records data database, a crowd-sourced land records database.

5. The method of claim 4 wherein the spacing unit information comprises spacing unit text, the spacing unit text including at least a legal description defining a geo-located spatial area.

6. The method of claim 1 wherein the spacing unit polygon comprises a modified spacing unit polygon based on applying a quarter call, the quarter call defining a geospatial portion of the geo-located area bounding the spacing unit.

7. The method of claim 6, further comprising:
applying, by the processor, computational geometry to join or add generated polygons to determine the modified spacing unit polygon.

8. The method of claim 1 wherein the land tract polygon comprises a modified land tract polygon based on applying a quarter call, the quarter call defining a geospatial portion of the geo-located area bounding the land tract.

9. The method of claim 1 wherein the land tract polygon comprises a least one of a join, an add and a combine operation applied in conjunction with at least one of the land tract polygon and the modified land tract polygon.

10. A server computing system comprising:
a processor; and
a memory including instructions, the instructions when executed in the processor causing operations comprising:
receiving, over a network, in the memory, a set of land tract boundary data and a set of spacing unit boundary data from a plurality of land tract data sources comprising a plurality of databases, wherein the land tract boundary data and spacing unit boundary data comprise one or more documents in a variety of formats, wherein the one or more documents include text suggestive of a legal description of mineral rights;
automatically parsing, in the processor, the one or more documents by searching for a predetermined set of words to identify spacing unit information and the legal description of mineral rights in the land tract;
receiving respective rules for automatically converting the variety of formats into a standard format;
applying, using the respective rules, standardization to the spacing unit information and the legal description of mineral rights in the land tract to generate standardized spacing unit information and standardized legal description of mineral rights in the land tract;
outputting, using the standardized spacing unit information and the standardized legal description of mineral rights, a geolocator object, wherein the server computing device has access to a geospatial database indexed by geolocator objects;
automatically looking up, using the geolocator object, content of the geospatial database, thereby generating a land tract polygon and a spacing unit polygon, the land tract and spacing unit polygons representing geo-located areas bounded by a land tract and a spacing unit respectively;
overlaying the land tract polygon and the spacing unit polygon;
determining, in the processor based on the overlaying, an intersection area defined in common between the land tract polygon and the spacing unit polygon;
allocating, in real time, an interest in mineral rights based at least partly on the intersection area, an expected royalty rate, and an allocation factor attributable to at least one of a plurality of contributing sources associated with the mineral right; and
generating a display of the interests in mineral rights on a display coupled to the server computing device.

11. The server computing system of claim 10 wherein allocating the interest comprises determining a royalty payment based at least partly on the intersection area, the expected royalty rate, and the allocation factor attributable to the at least one of the plurality of contributing sources associated with the mineral right.

12. The server computing system of claim 10 further comprising instructions causing allocating the interest in mineral rights based on a mineral acreage representing an area within the land tract that is associated with mineral contribution.

13. The server computing system of claim 10 wherein the plurality of databases includes at least two of: a website, a government land records data database, a crowd-sourced land records database.

14. The server computing system of claim 13 wherein the spacing unit information comprises spacing unit text, the spacing unit text including at least a legal description defining a geo-located spatial area.

15. The server computing system of claim 10 wherein the spacing unit polygon comprises a modified spacing unit polygon based on applying a quarter call, the quarter call defining a geospatial portion of the geo-located area bounding the spacing unit.

16. The server computing system of claim 15 wherein the operations further comprise:
applying, by the processor, computational geometry to join or add generated polygons to determine the modified spacing unit polygon.

17. The server computing system of claim 10 wherein the land tract polygon comprises a modified land tract polygon based on applying a quarter call, the quarter call defining a geospatial portion of the geo-located area bounding the land tract.

18. A non-transitory machine readable medium storing processor-executable instructions, the instructions when executed in a processor causing operations comprising:

receiving, over a network, in the memory, a set of land tract boundary data and a set of spacing unit boundary data from a plurality of land tract data sources comprising a plurality of databases, wherein the land tract boundary data and spacing unit boundary data comprise one or more documents in a variety of formats, wherein the one or more documents include text suggestive of a legal description of mineral rights;

automatically parsing, in the processor, the one or more documents by searching for a predetermined set of words to identify spacing unit information and the legal description of mineral rights in the land tract;

receiving respective rules for automatically converting the variety of formats into a standard format;

applying, using the respective rules, standardization to the spacing unit information and the legal description of mineral rights in the land tract to generate standardized spacing unit information and standardized legal description of mineral rights in the land tract;

outputting, using the standardized spacing unit information and the standardized legal description of mineral rights, a geolocator object, wherein the server computing device has access to a geospatial database indexed by geolocator objects;

automatically looking up, using the geolocator object, content of the geospatial database, thereby generating a land tract polygon and a spacing unit polygon, the land tract and spacing unit polygons representing geo-located areas bounded by a land tract and a spacing unit respectively;

overlaying the land tract polygon and the spacing unit polygon;

determining, in the processor based on the overlaying, an intersection area defined in common between the land tract polygon and the spacing unit polygon;

allocating, in real time, an interest in mineral rights based at least partly on the intersection area, an expected royalty rate, and an allocation factor attributable to at least one of a plurality of contributing sources associated with the mineral right; and generating a display of the interests in mineral rights on a display coupled to the server computing device.

\* \* \* \* \*